H. L. DUNCAN.
CHAIN LINK.
APPLICATION FILED NOV. 1, 1917.

1,256,118.  Patented Feb. 12, 1918.

BLANKS

ELECTRIC WELDING

SWADGING

INVENTOR
Harry L. Duncan

UNITED STATES PATENT OFFICE.

HARRY L. DUNCAN, OF MAHWAH, NEW JERSEY.

CHAIN-LINK.

1,256,118.  Specification of Letters Patent.  Patented Feb. 12, 1918.

Original application filed September 27, 1917, Serial No. 193,586. Divided and this application filed November 1, 1917. Serial No. 199,625.

*To all whom it may concern:*

Be it known that I, HARRY L. DUNCAN, a citizen of the United States, and resident of Mahwah, county of Bergen, and State of New Jersey, have made a certain new and useful Invention in Chain-Links, of which the following is a specification, taken in connection with the accompanying drawing, which forms part of this application, which is a division of my copending application, Serial No. 193,586, filed September 27, 1917.

This invention relates to studded chain links in which the link material may be electrically butt-welded together in one or both sides of the link adjacent the link stud which may be formed with a recessed or irregular end to accommodate each protruding fin or weld projection. In this way the protruding weld enlargement may cause an interlocking engagement between the link and stud, and what is still more important effect a substantial enlargement of the cross-section of the link material adjacent the weld without undesirably or noticeably affecting the appearance of the link. Where the link blanks are U-shaped with square cut ends, for instance, the portions of the weld fin which project from the link material outside of the more or less encircling stud ends may be removed in any suitable way as by cutting or trimming preferably while the material is still highly heated, and with or without this preliminary treatment the link sides adjacent the weld may be swaged together to force them into more interlocking holding engagement with the stud ends and to smooth and finish their surfaces. In some cases it is desirable to have the link blanks so formed or forced together that the weld fin or enlargement projects or protrudes to a greater extent inward into the recess in the link stud and this may be conveniently effected by forming the link blanks of generally U-shaped form with somewhat diverging sides, or if desired, the U-shaped blanks may have substantially parallel sides, and ends which are inwardly beveled or otherwise formed so as to meet adjacent the inside of the link while still considerably separated at the outer portions. In this way when the link portions are forced together during the electric welding process the inner portions are the first to soften and weld and the weld fin thus projects to a considerably greater extent inward into the stud recesses before the exposed outer portion of the weld is made.

An illustrative form of link and process of making the same is shown in a somewhat diagrammatic way in the accompanying drawing, in which—

Figure 1:
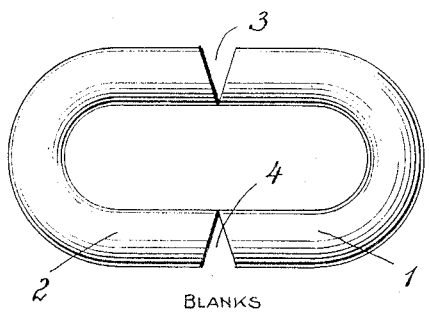

Figure 1 shows a pair of link blanks as brought together for welding.

Figure 2:
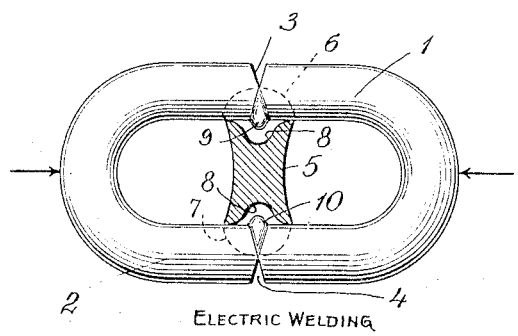

Fig. 2 indicates the electric welding of the blanks; and

Figure 3:
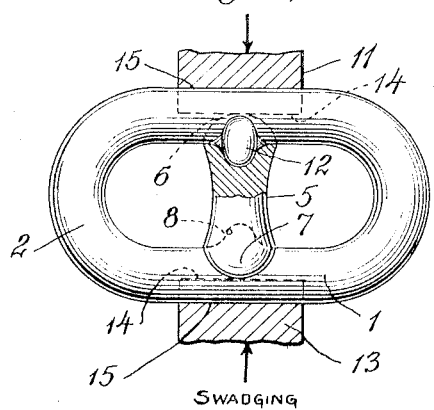

Fig. 3 shows a completely welded link during the finishing swaging operation.

This process may be used in the manufacture of heavy studded chain links, such as may be used for ships' cables and the usual wrought iron or soft steel stock used for this purpose, may have a diameter of several inches more or less, although, of course, other materials and shapes of stock may be used for the blanks if desired. With heavy links formed of round stock the blanks, such as 1, 2, may be bent or formed into general U-shape, preferably though not necessarily having substantially parallel sides and the ends of the blank may in some cases be advantageously inwardly beveled so that when brought together as indicated in Fig. 1 they first meet adjacent the inside of the link while still considerably separated at the outer portions, the V-shaped spaces 3, 4, being left between the outer portions of the blank ends where uniform beveling has been resorted to.

The ends of the link blanks are preferably though not necessarily electrically welded in any suitable form of welding apparatus, the link stud, when the blanks have substantially parallel sides, is advantageously first inserted and then held in place as by heavy clamps on both sides of the stud ends 6, 7, to prevent their being forced open by the upsetting blank ends during the welding; although, of course, in some cases and preferably with somewhat more diverging blanks the link stud may be inserted or forced into place after the weld is partly or wholly completed. The coöperating link stud may be of any suitable form and material and preferably has ends of recessed or other irregular shape so that the protruding weld fins or enlargements more or less interlock with or engage the stud ends and are preferably sufficiently hidden within or appear to merge into the outline of the stud ends to give the link a more pleasing and finished contour. The link stud 5 may as indicated have its ends 6, 7, partly extending around the adjacent sides of the link material at the point of weld, and stud recesses of any suitable form and of the desired size may be arranged in the ends of the stud so as to receive the weld fins or enlargements which protrude from the ends of the link blanks during or after the welding thereof. If thought desirable to prevent excessive electric contact between the weld fins and the stud these stud recesses may be first given a light adherent coating of any suitable refractory material, such as magnesia, lime or the like, which tends to prevent undesirable short-circuiting of the welding current, although in some cases slight welding of the stud to the adjacent parts of the link is unobjectionable and makes the finished link still stronger. These stud recesses may advantageously extend for a considerable distance around the link sides and with such an arrangement as is indicated in Figs. 2 and 3 the stud recesses may extend nearly half way around the stock at the sides of the link and may be of such capacity in some cases as to make possible an enlargement of the cross-section of the welded joint of as much as thirty or forty per cent. or so of the normal cross-section of the link material. This enlargement of the link side within the recess is of course entirely hidden so as not to give the link an objectionable appearance and aside from greatly strengthening the joint has the added advantage of securely holding the link stud in proper position. During the welding of the link blanks they are of course powerfully forced together in the direction of the arrows in Fig. 2. and their ends may be brought up to welding heat by the passing electric current so that the weld forms first at their meeting portions near the inside of the link and then throughout a greater and greater area, the blank ends being heated for a considerable distance back from the joint so that the heavy pressure used can upset these ends to increase their cross section and form the heavy weld fins 9, 10 which protrude in the first instance inward into the stud recesses 8 where this form of blank end is used. This arrangement makes it possible to first weld the inner portions of the joint within the link stud so that they are likely to be thoroughly united, the outer portions of the weld being of course subject to observation so that their condition and effective union can be more accurately determined as the blanks are forced together and the spaces 3, 4 gradually closed, the weld fin naturally being forced out progressively around the different parts of the blanks with this arrangement. It is of course understood that the previously welded link of the chain may be interlocked or threaded through by one of the link blanks before welding it to the rest of the new link.

When the weld has been completed the outer sides of the link projecting beyond the engaging or partially encircling stud ends may, if desired, be smoothed in any suitable way, as for instance, by more or less removing the protruding weld fin or enlargement preferably while it is still hot and more or less soft as by cutting or trimming it away with any suitable device; and with or without this preliminary removal of part or all of the protruding weld enlargement the link sides may with advantage be swaged or forced together to bring the joined ends of the link blanks into more accurate alinement and to smooth and finish these outer exposed surfaces. For this purpose swaging dies 11. 13, which may have curved inner faces corresponding to the shape of the link material so that their edges 14 may be located on opposite sides thereof and adjacent the ends of the link stud, may be forced together in the desired way so that the sides 15 of the link may be brought into accurate alinement and smoothed or finished. At the same time the more or less softened material at the joint may be forced inward so that the weld projections 12 may be more intimately interlocked with the stud ends so as to securely hold the parts of the link in desired position, although it is of course understood that the weld fins or enlargements need not in all cases completely fill these stud recesses.

This invention has been disclosed in connection with a number of illustrative embodiments, forms, parts, shapes, materials, devices, processes, conditions and orders of steps, to the details of which disclosure the invention is not of course to be limited, since what is claimed as new and what is desired to be secured by Letters Patent is set forth in the appended claims:

1. The studded chain link formed of round stock and having an electrically butt welded joint in both sides of the link and a link stud formed with encircling ends extending partially around the stock adjacent the sides of the link and having recesses in the stud ends adjacent the welded joints and weld enlargements extending inward into said stud recesses and interlocking with the link stud to hold it in position and effecting at least a 30% enlargement of the cross-section of the link sides at the points of weld.

2. The studded chain link formed of round stock and having an electrically butt welded joint in both sides of the link and a link stud having recesses in the stud ends adjacent the welded joints and weld enlargements extending inward into said stud recesses and effecting a substantial enlargement of the cross section of the link sides at the points of weld.

3. The studded chain link having a butt welded joint in both sides of the link and a link stud formed with recesses in its ends adjacent the welded joints, there being weld enlargements extending into said stud recesses and effecting at least a 20% enlargement of the cross-section of the link sides at the points of weld.

4. The studded chain link having a welded joint in both sides of the link and a link stud formed with irregular ends adjacent the welded joints, there being weld enlargements engaging and holding in position the ends of the link stud.

5. The studded chain link having an electrically butt welded joint in one of the sides of the link and a link stud having ends partially encircling the link sides and formed with a recess adjacent the point of weld, there being a projecting weld enlargement extending into said recess and interlocking with said link stud to hold the same in position and materially increasing the cross-section of the link sides at the point of weld.

6. The studded chain link having a butt welded joint in one of the sides of the link and a link stud formed with a recess adjacent the point of weld, there being a projecting weld enlargement extending into said recess and interlocking with said link stud and materially increasing the cross-section of the link side at the point of weld.

7. The studded chain link having a welded joint in one of the sides of the link and a link stud formed with an irregular end adjacent the point of weld, there being a projecting weld enlargement engaging and interlocking with the irregular end of said link stud to hold the same in position and materially increasing the cross-section of the link side at the point of weld.

8. The studded chain link having a welded joint in both sides of the link and a link stud formed with irregular ends adjacent the welded joints, there being weld enlargements engaging and holding in position the ends of the link stud and effecting at least a 30% enlargement of the cross-section of the link side at the point of weld.

9. The studded chain link having a welded joint in one of the sides of the link and a link stud formed with an irregular end adjacent the point of weld, there being a projecting weld enlargement engaging and interlocking with the irregular end of said link stud to hold the same in position and effecting at least a 30% enlargement of the cross-section of the link side at the point of weld.

HARRY L. DUNCAN.

Witnesses:
JESSIE B. KAY,
KATHARINE B. MULCAHY.